United States Patent Office 3,316,269
Patented Apr. 25, 1967

3,316,269
**2-PYRIDYL-2,3-DIHYDRO-4(1H)-QUINAZO-
LINONES AND DERIVATIVES THEREOF**
Edgar S. Schipper, Clifton, N.J., assignor to Shulton, Inc.,
Clifton, N.J., a corporation of New Jersey
No Drawing. Filed Oct. 16, 1964, Ser. No. 404,490
17 Claims. (Cl. 260—256.4)

This invention relates to 2-pyridyl-2,3-dihydro-4(1H)-quinazolinones and their non-toxic salts.

The 2-pyridyl-2,3-dihydro-4(1H)-quinazolinones of this invention are new compounds having the following formula:

(1) 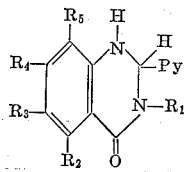

in which Py is pyridyl such as 2-pyridyl or 4-pyridyl; $R_1$ is hydrogen, lower alkyl, cycloalkyl, allyl, propargyl, aralkyl, aryl and substituted aryl in which the substituents are lower alkyl, trifluoromethyl, lower alkoxy and halogen; and $R_2$, $R_3$, $R_4$ and $R_5$ are lower alkoxy, hydrogen and halogen. Examples of lower alkyl and lower alkoxy are those containing less than 6 carbon atoms, such as methyl or methoxy. An example of cycloalkyl is cyclopropyl, that of an aralkyl is homoveratryl, that of an aryl is phenyl, that of a substituted aryl is tolyl, methoxyphenyl or chloropenyl and of a halogen is chlorine or bromine.

The compounds of this invention manifest central nervous system depressant activity in mammals at dosages from 10 to 300 mg. per kg. of body weight. Such dosages are significantly lower than the respective $LD_{50}$ of such compounds.

The new 2-pyridyl-2,3-dihydro-4(1H)-quinazolinones of this invention may be produced by reacting, in the presence of a base, such as an alkali metal hydroxide, a pyridine carboxaldehyde with an anthranilamide having the formula:

(2) 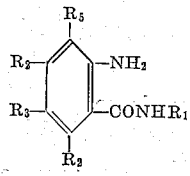

in which $R_1$, $R_2$, $R_3$, $R_4$ and $R_5$ have the same meaning as heretofore defined.

The 2-pyridyl-2,3-dihydro-4(1H)-quinazolinones are produced in accordance with the following reaction:

(3) 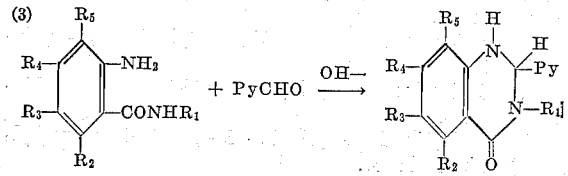

Non-toxic salts of the 2-pyridyl-2,3-dihydro-4(1H)-quinazolinones of this invention are produced by mixing equal molecular amounts of the required 2-pyridyl-2,3-dihydro-4(1H)-quinazolinone and the required acid in an inert solvent such as ether, ethanol, benzene or toluene, and subsequently filtering the precipitated salt or evaporating the solvent and recovering the solid residue. Salts of inorganic acids such as hydrochloric, sulfuric or phosphoric acid or salts of organic acids such as acetic, succinic, tartaric or ascorbic acid of the 2-pyridyl-2,3-dihydro-4(1H)-quinazolinones may be produced in this manner.

A more comprehensive understanding of this invention is obtained by reference to the following examples:

*Examples 1–16*

2,3-dihydro-2-(4-pyridyl)-4(1H)-quinazolinone;
2,3-dihydro-2-(2-pyridyl)-4(1H)-quinazolinone;
2,3-dihydro-2-(2-pyridyl)-6-chloro-4(1H)-quinazolinone;
2,3-dihydro-2-(2-pyridyl)-7-chloro-4(1H)-quinazolinone;
2,3-dihydro-2-(2-pyridyl)-5-methoxy - 4(1H) - quinazolinone;
2,3-dihydro-2-(2-pyridyl)-8-methoxy - 4(1H) - quinazolinone;
2,3-dihydro-2-(2-pyridyl)-3-isopropyl - 4(1H) - quinazolinone;
2,3-dihydro-2-(2-pyridyl)-3-p-anisyl - 6 - chloro - 4(1H) - quinazolinone;
2,3-dihydro-2-(2-pyridyl)-3 - homoveratryl - 6 - chloro - 4(1H)-quinazolinone;
2,3-dihydro-2-(2-pyridyl)-3-propargyl - 4(1H) - quinazolinone;
2,3-dihydro-2-(2-pyridyl)-3-allyl-4(1H)-quinazolinone;
2,3-dihydro-2-(2-pyridyl)-3-cyclopropyl-4(1H) - quinazolinone;
2,3-dihydro-2-(2-pyridyl)-3-o-tolyl-4(1H)-quinazolinone;
2,3-dihydro-2-(2 - pyridyl) - 3 - p-chlorophenyl - 4(1H) - quinazolinone;
2,3-dihydro-2-(2-pyridyl)-3-m - trifluoromethyl - 4(1H) - quinazolinone;
2,3-dihydro-2-(2-pyridyl)-3 - ethyl - 6 - chloro - 4(1H) - quinazolinone.

Each of the above 2-pyridyl-2,3-dihydro-4-(1H)-quinazolinones are produced by refluxing for two hours a solution of 0.1 M of an anthranilamide as denoted in the following Table I and 0.1 M (10.7 g.) of the pyridine carboxaldehyde, also specified in Table I, in 100 ml. of ethanol. A solution of 80 ml. of 8% sodium hydroxide was added and the mixture was heated on a steam bath for 5–30 minutes. The reaction product crystallized from the solution when it was placed in the refrigerator at 0° C. for 2–24 hours. The product was filtered off and recrystallized in a solvent as specified in Table II.

The Table II below shows the solvent which was used in the recrystallization of the 2-pyridyl-2,3-dihydro-4(1H)-quinazolinone of each of the examples and the melting point, analysis of carbon, hydrogen and nitrogen, as calculated and found, and yield of each of the 2-pyridyl-2,3-dihydro-4(1H)-quinazolinones produced by the practice of each of the examples.

TABLE I

| Example | 2-pyridyl-2,3-dihydro-4(1H)-quinazolinones Produced | Anthranilamide Used | Pyridine Carboxaldehyde Used |
|---|---|---|---|
| 1 | 2,3-dihydro-2-(4-pyridyl)-4(1H)-quinazolinone | Anthranilamide | 4-pyridine carboxaldehyde. |
| 2 | 2,3-dihydro-2-(2-pyridyl)-4(1H)-quinazolinone | do | 2-pyridine carboxaldehyde. |
| 3 | 2,3-dihydro-2-(2-pyridyl)-6-chloro-4(1H)-quinazolinone | 5-chloroanthranilamide | Do. |
| 4 | 2,3-dihydro-2-(2-pyridyl)-7-chloro-4(1H)-quinazolinone | 4-chloroanthranilamide | Do. |
| 5 | 2,3-dihydro-2-(2-pyridyl)-5-methoxy-4(1H)-quinazolinone | 6-methoxyanthranilamide | Do. |
| 6 | 2,3-dihydro-2-(2-pyridyl)-8-methoxy-4(1H)-quinazolinone | 3-methoxyanthranilamide | Do. |
| 7 | 2,3-dihydro-2-(2-pyridyl)-3-isopropyl-4(1H)-quinazolinone | 2-amino-N-isopropylbenzamide | Do. |
| 8 | 2,3-dihydro-2-(2-pyridyl)-3-p-anisyl-6-chloro-4(1H)-quinazolinone | 2-amino-5-chloro-N-p-anisylbenzamide | Do. |
| 9 | 2,3-dihydro-2-(2-pyridyl)-3-homoveratryl-6-chloro-4(1H)-quinazolinone | 2-amino-5-chloro-N-homoveratrylbenzamide | Do. |
| 10 | 2,3-dihydro-2-(2-pyridyl)-3-propargyl-4(1H)-quinazolinone | 2-amino-N-propargylbenzamide | Do. |
| 11 | 2,3-dihydro-2-(2-pyridyl)-3-allyl-4(1H)-quinazolinone | 2-amino-N-allylbenzamide | Do. |
| 12 | 2,3-dihydro-2-(2-pyridyl)-3-cyclopropyl-4(1H)-quinazolinone | 2-amino-N-cyclopropylbenzamide | Do. |
| 13 | 2,3-dihydro-2-(2-pyridyl)-3-o-tolyl-4(1H)-quinazolinone | 2-amino-N-o-tolylbenzamide | Do. |
| 14 | 2,3-dihydro-2-(2-pyridyl)-3-p-chlorophenyl-4(1H)-quinazolinone | 2-amino-N-p-chlorophenylbenzamide | Do. |
| 15 | 2,3-dihydro-2-(2-pyridyl)-3-m-trifluoromethyl-4(1H)-quinazolinone | 2-amino-N-m-trifluoromethylbenzamide | Do. |
| 16 | 2,3-dihydro-2-(2-pyridyl)-3-ethyl-6-chloro-4(1H)-quinazolinone | 2-amino-5-chloro-N-ethylbenzamide | Do. |

TABLE II

| Example | Solvent Used in Recrystallization | M.P., °C. | Calculated | | | Found | | | Yield, Percent |
|---|---|---|---|---|---|---|---|---|---|
| | | | C | H | N | C | H | N | |
| 1 | Ethyl acetate | 175–177 | 69.32 | 4.92 | 18.66 | 69.43 | 4.75 | 18.40 | 48 |
| 2 | do | 189–190 | 69.32 | 4.92 | 18.66 | 68.99 | 4.82 | 18.22 | 80 |
| 3 | Methanol | 203–204 | 60.12 | 3.88 | 16.18 | 60.10 | 3.90 | 16.40 | 65 |
| 4 | do | 211–213 | 60.12 | 3.88 | 16.18 | 60.19 | 4.03 | 16.05 | 58 |
| 5 | Ethanol | 186–188 | 65.87 | 5.13 | 16.46 | 65.91 | 5.15 | 16.42 | 38 |
| 6 | Ethyl acetate | 176–178 | 65.87 | 5.13 | 16.46 | 66.12 | 5.44 | 16.39 | 32 |
| 7 | do | 197–198 | 71.88 | 6.41 | 15.72 | 71.86 | 6.54 | 15.30 | 80 |
| 8 | do | 195–197 | 65.66 | 4.41 | 11.49 | 65.90 | 4.44 | 11.43 | 83 |
| 9 | do | 174–175 | 65.17 | 5.23 | 9.92 | 65.35 | 5.56 | 9.97 | 94 |
| 10 | do | 163–165 | 72.98 | 4.98 | 15.96 | 73.12 | 5.31 | 15.80 | 66 |
| 11 | do | 112–113 | 72.43 | 5.70 | 15.84 | 72.68 | 5.66 | 15.85 | 57 |
| 12 | do | 190–191 | 72.43 | 5.70 | 15.84 | 72.68 | 5.90 | 15.61 | 55 |
| 13 | Ethanol | 193–194 | 76.17 | 5.44 | 13.32 | 75.86 | 5.12 | 13.40 | 89 |
| 14 | Methanol | 195–196 | 67.96 | 4.20 | 12.51 | 67.53 | 4.22 | 12.54 | 91 |
| 15 | Benzene/hexane | 141–142 | 65.04 | 3.82 | 11.38 | 65.29 | 3.92 | 11.14 | 53 |
| 16 | Ethyl acetate | 128–129 | 62.63 | 4.90 | 14.60 | 63.10 | 5.13 | 14.52 | 94 |

What is claimed is:

1. A compound selected from the class consisting of 2-pyridyl-2,3-dihydro-4(1H)-quinazolinones and non-toxic acid addition salts thereof, said 2-pyridyl-2,3-dihydro-4(1H)-quinazolinones having the formula:

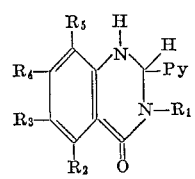

in which Py is selected from the class consisting of 2-pyridyl and 4-pyridyl; $R_1$ is a member selected from the class consisting of hydrogen, lower alkyl, cyclopropyl, allyl, propargyl, homoveratryl, phenyl and substituted phenyl in which the substituents are selected from the class consisting of lower alkyl, trifluoromethyl, lower alkoxy and halogen; and $R_2$, $R_3$, $R_4$ and $R_5$ are selected from the class consisting of lower alkoxy, hydrogen and halogen.

2. 2,3-dihydro-2-(4-pyridyl)-4(1H)-quinazolinone.
3. 2,3-dihydro-2-(2-pyridyl)-4(1H)-quinazolinone.
4. 2,3-dihydro-2-(2-pyridyl)-6-chloro-4(1H)-quinazolinone.
5. 2,3-dihydro-2-(2-pyridyl)-7-chloro-4(1H)-quinazolinone.
6. 2,3-dihydro-2-(2-pyridyl)-5-methoxy-4(1H)-quinazolinone.
7. 2,3-dihydro-2-(2-pyridyl)-8-methoxy-4(1H)-quinazolinone.
8. 2,3-dihydro-2-(2-pyridyl)-3-isopropyl-4(1H)-quinazolinone.
9. 2,3-dihydro-2-(2-pyridyl)-3-p-anisyl-6-chloro-4(1H)-quinazolinone.
10. 2,3-dihydro-2-(2-pyridyl)-3-homoveratryl-6-chloro-4(1H)-qinazolinone.
11. 2,3-dihydro-2-(2-pyridyl)-3-propargyl-4(1H)-quinazolinone.
12. 2,3-dihydro-2-(2-pyridyl)-3-allyl-4(1H)-quinazolinone.
13. 2,3-dihydro-2-(2-pyridyl)-3-cyclopropyl-4(1H)-quinazolinone.
14. 2,3-dihydro-2-(2-pyridyl)-3-o-tolyl-4(1H)-quinazolinone.
15. 2,3-dihydro-2-(2-pyridyl)-3-p-chlorophenyl-4(1H)-quinazolinone.
16. 2,3-dihydro-2-(2-pyridyl)-3-m-trifluoromethyl-4(1H)-quinazolinone.

17. 2,3 - dihydro-2-(2-pyridyl)-3-ethyl-6-chloro-4(1H)-quinazolinone.

References Cited by the Examiner

UNITED STATES PATENTS

| | | | |
|---|---|---|---|
| 3,086,910 | 4/1963 | Shetty et al. | 260—256.4 X |
| 3,213,094 | 10/1965 | Morgan et al. | 260—256.4 X |

OTHER REFERENCES

Feldman: Jour. Org. Chem., vol. 7, 1942, pages 31–33.
Smith et al.: Tetrahedron, 1957, vol. pp. 38–44.

ALEX MAZEL, *Primary Examiner.*
MARY O'BRIEN, *Assistant Examiner.*